(12) United States Patent
Kim et al.

(10) Patent No.: US 9,206,778 B2
(45) Date of Patent: Dec. 8, 2015

(54) DUAL FUEL INJECTOR WITH F, A AND Z ORIFICE CONTROL

(71) Applicant: Caterpillar, Inc., Peoria, IL (US)

(72) Inventors: Hoisan Kim, Dunlap, IL (US); Mark F. Sommars, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 243 days.

(21) Appl. No.: 13/866,481

(22) Filed: Apr. 19, 2013

(65) Prior Publication Data

US 2014/0311455 A1  Oct. 23, 2014

(51) Int. Cl.
| F02M 43/04 | (2006.01) |
| F02M 21/02 | (2006.01) |
| F02M 45/08 | (2006.01) |
| F02D 19/06 | (2006.01) |
| F02D 19/10 | (2006.01) |

(52) U.S. Cl.
CPC ............ *F02M 43/04* (2013.01); *F02D 19/0694* (2013.01); *F02D 19/10* (2013.01); *F02M 21/0248* (2013.01); *F02M 45/086* (2013.01)

(58) Field of Classification Search
CPC ............ F02D 19/0694; F02D 19/0642; F02D 19/0644; F02D 19/0647; F02D 19/10; F02D 19/105; F02M 21/0251; F02M 21/0254; F02M 43/04

USPC .............. 123/27 GE, 525, 526, 304, 575, 446
See application file for complete search history.

(56) References Cited

U.S. PATENT DOCUMENTS

| 3,575,147 | A  | * | 4/1971  | Harrison       |
| 5,636,796 | A  |   | 6/1997  | Oguma          |
| 6,027,037 | A  | * | 2/2000  | Murakami       |
| 6,422,199 | B1 | * | 7/2002  | Buckley        |
| 6,499,674 | B2 |   | 12/2002 | Ren et al.     |
| 6,913,210 | B2 |   | 7/2005  | Baasch et al.  |
| 7,357,124 | B2 |   | 4/2008  | Elia et al.    |
| 7,556,017 | B2 | * | 7/2009  | Gibson         |
| 7,891,579 | B2 | * | 2/2011  | Mashida        |
| 2001/0003976 | A1 | * | 6/2001  | Lehtonen     |
| 2011/0108631 | A1 | * | 5/2011  | Mumford      |
| 2011/0220064 | A1 |   | 9/2011  | Fang et al.  |
| 2012/0187218 | A1 |   | 7/2012  | Kim et al.   |

FOREIGN PATENT DOCUMENTS

CA    2743043    8/2011

* cited by examiner

*Primary Examiner* — Stephen K Cronin
*Assistant Examiner* — Kevin R Steckbauer

(57) ABSTRACT

A dual fuel injector utilizes first and second control valves to open and close first and second nozzle outlet sets to inject a first fuel and a second fuel, respectively. The first and second fuels may be natural gas and liquid diesel, respectively. Control over liquid and diesel fuel injection events includes control lines that include F, A, and Z orifices.

18 Claims, 6 Drawing Sheets

DUAL FUEL INJECTOR WITH F, A AND Z ORIFICE CONTROL

TECHNICAL FIELD

The present disclosure relates generally to dual fuel injectors, and more particularly to a control strategy that utilizes F, A and Z orifices.

BACKGROUND

There has been a growing trend in the engine industry to consider fueling engines with two fuels from a single fuel injector associated with each engine cylinder. The two fuels may differ from one another in at least one of chemical identity, matter phase and pressure. For instance, there has been increasing interest in powering compression ignition engines primarily with natural gas injected at a first pressure that is ignited from a compression ignited small pilot injection of liquid diesel fuel. However, in order to be viable, the fuel injector must generally have the ability to independently control both timing and quantity of the injection of the two different fuels. This in turn may require two separate electronically controlled valves housed within the single fuel injector. Finding a way to organize the plumbing, and arrange two independent electrical actuators and their associated control valves within a single fuel injector has proven to be difficult and problematic. Further complicating these problems are developing a control strategy that can satisfy the increasingly stringent performance demands required by modern fuel systems.

The present disclosure is directed to one or more of the problems set forth above.

SUMMARY

In one aspect, a fuel injector includes an injector body that defines a first fuel inlet, a second fuel inlet, a first nozzle outlet set, a second nozzle outlet set and a drain outlet. A first control chamber and a second control chamber are disposed in the injector body. A first check valve member has a closing hydraulic surface exposed to fluid pressure in the first control chamber. The first check valve member is movable between a closed position in contact with a first nozzle seat to fluidly block the first fuel inlet to the first nozzle outlet set, and open position out of contact with the first nozzle seat to fluidly connect the first fuel inlet to the first nozzle outlet set. A second check valve member has a closing hydraulic surface exposed to fluid pressure in the second control chamber. The second check valve member is movable between a closed position in contact with a second nozzle seat to fluidly block the second fuel inlet to the second nozzle outlet set, and an open position out of contact with the second nozzle seat to fluidly connect the second fuel inlet to the second nozzle outlet set. A first control valve member is positioned in the injector body and movable between a first position in contact with a first valve seat at which the first control chamber is fluidly blocked to the drain outlet, and a second position out of contact with the first valve seat at which one of the first fuel inlet and the second fuel inlet is fluidly connected to the drain outlet through a Z-A pathway and an F pathway that are fluidly in parallel with each other. The Z-A pathway includes a Z orifice, the first control chamber and an A orifice in series, and the F pathway includes an F orifice. A second control valve member is positioned in the injector body and movable between a first position in contact with a second valve seat at which the second control chamber is fluidly blocked to the drain outlet, and a second position out of contact with the second valve seat at which the second control chamber is fluidly connected to the drain outlet.

In another aspect, a fuel system according to the present disclosure includes a plurality of fuel injectors with a source of first fuel fluidly connected to the first fuel inlet, and a source of second fuel fluidly connected to the second fuel inlet. Each fuel injector includes a first Z-A pathway, a first F pathway and first F, A and Z orifices associated with the first control valve, and a second Z-A pathway, second F pathway and second F, A and Z orifices associated with the second control valve. An electronic controller is in control communication with each of the plurality of fuel injectors. The first fuel differs from the second fuel in at least of one of chemical identity, matter phase and pressure.

In still another aspect, a method of operating the fuel system includes injecting a first fuel from the first nozzle outlet set by moving the first control valve member from the first position to the second position. A second fuel is injected form the second nozzle outlet set by moving the second control valve member from the first position to the second position.

DETAILED DESCRIPTION

Figure 1:
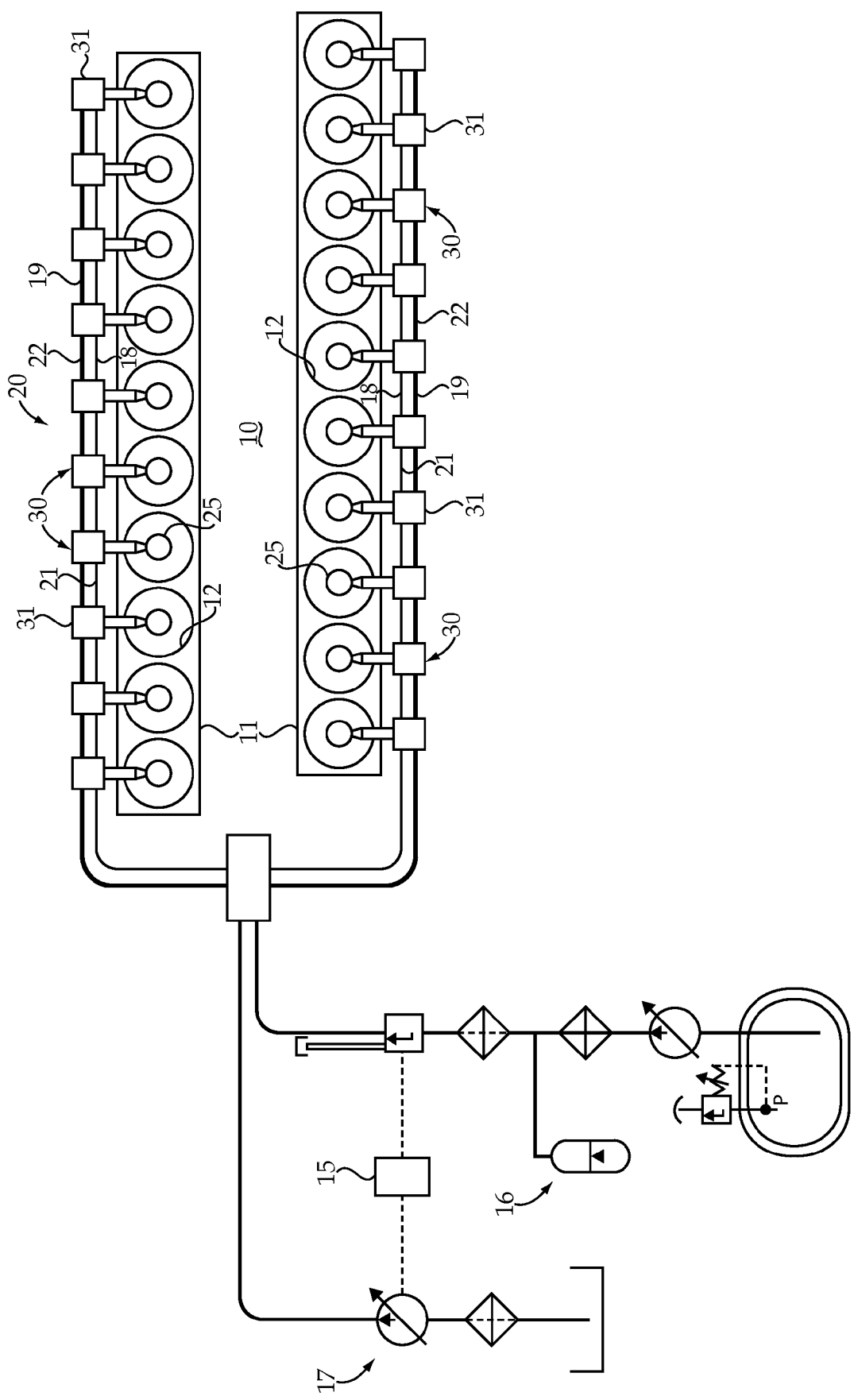
FIG. 1 is a schematic view of a dual fuel engine according to the present disclosure.
Figure 2:
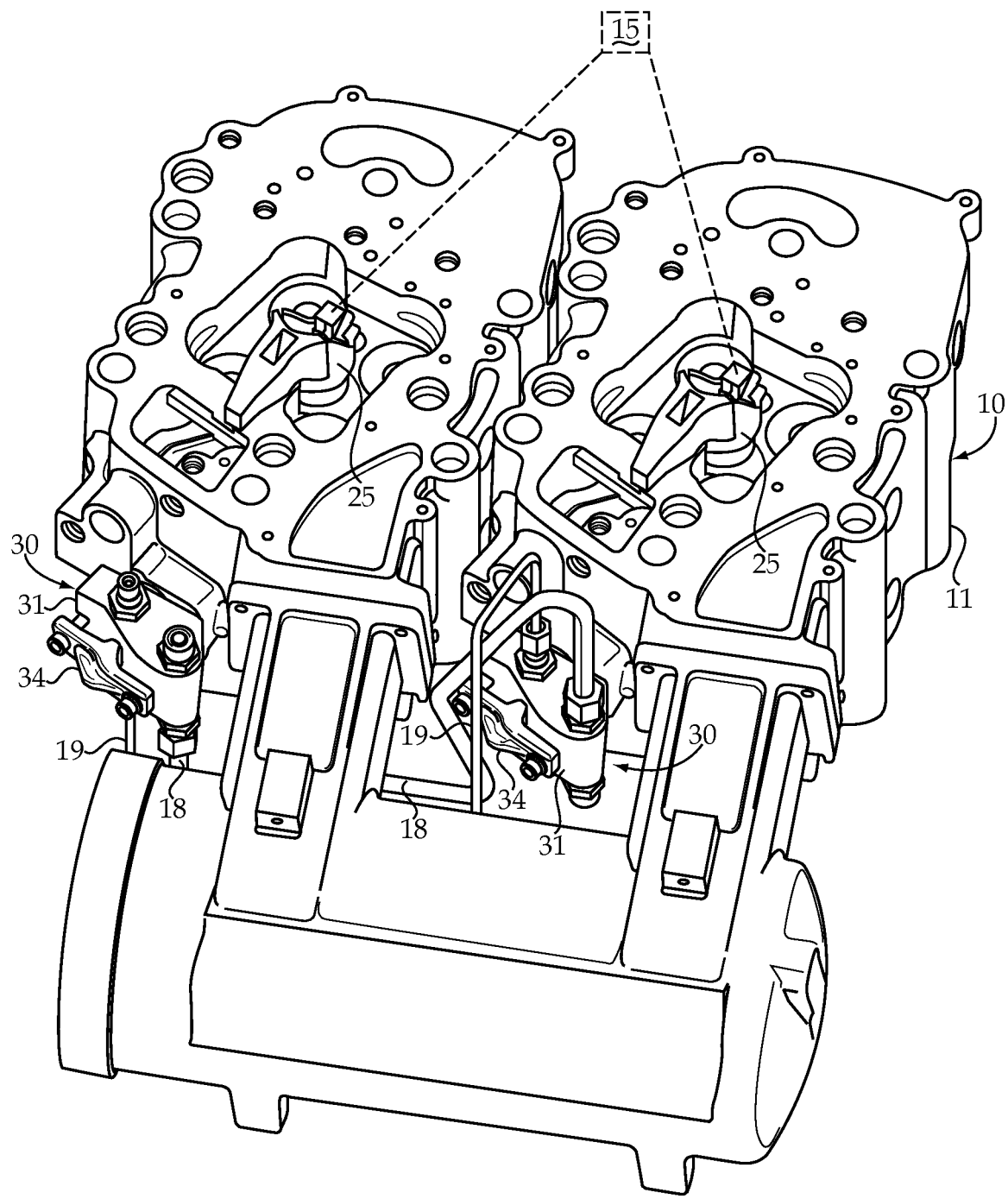
FIG. 2 is a perspective view of a portion of the engine and dual fuel common rail system for the engine of FIG. 1.
Figure 3:
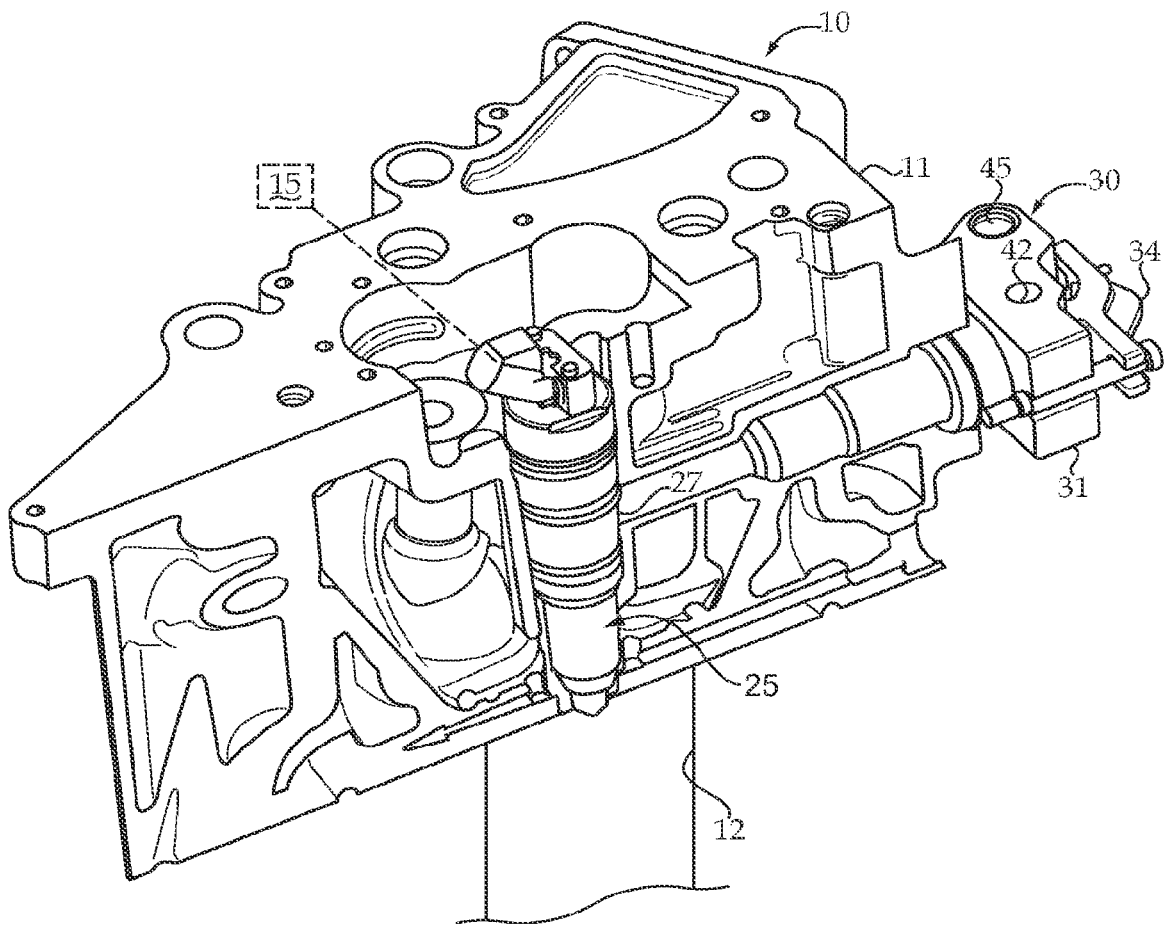
FIG. 3 is a sectioned perspective view of a portion of the engine housing shown in FIG. 2 to reveal structure for one fuel injector and engine cylinder.

Referring initially to FIGS. 1-3, a dual fuel engine 10 includes a dual fuel common rail system 20 mounted to an engine housing 11 that defines a plurality of engine cylinders 12. The dual fuel common rail system 20 includes exactly one fuel injector 25 positioned for direct injection into each of the plurality of engine cylinders 12. A gaseous fuel common rail 21 and a liquid fuel common rail 22 are fluidly connected to each fuel injector 25. The dual fuel common rail system 20 also includes gas supply and pressure control devices 16 as well as liquid supply and pressure control devices 17. Each of the fuel injectors 25, the gas pressure supply and control devices 16 and the liquid supply and pressure control devices 17 are controlled by an electronic controller 15 in a known manner. The gas supply and pressure control devices 16 may include a pressurized cryogenic liquefied natural gas tank with an outlet fluidly connected to a variable delivery cryogenic pump. Devices 16 may also include a heat exchanger, an accumulator, a gas filter and a fuel conditioning module that controls the supply and pressure of gaseous fuel to gaseous fuel common rail 21. The liquid supply and pressure control devices 17 may include a diesel fuel tank, fuel filters and an electronically controlled high pressure fuel pump that supply liquid fuel to, and control pressure in, liquid fuel common rail 22.

Figure 4:
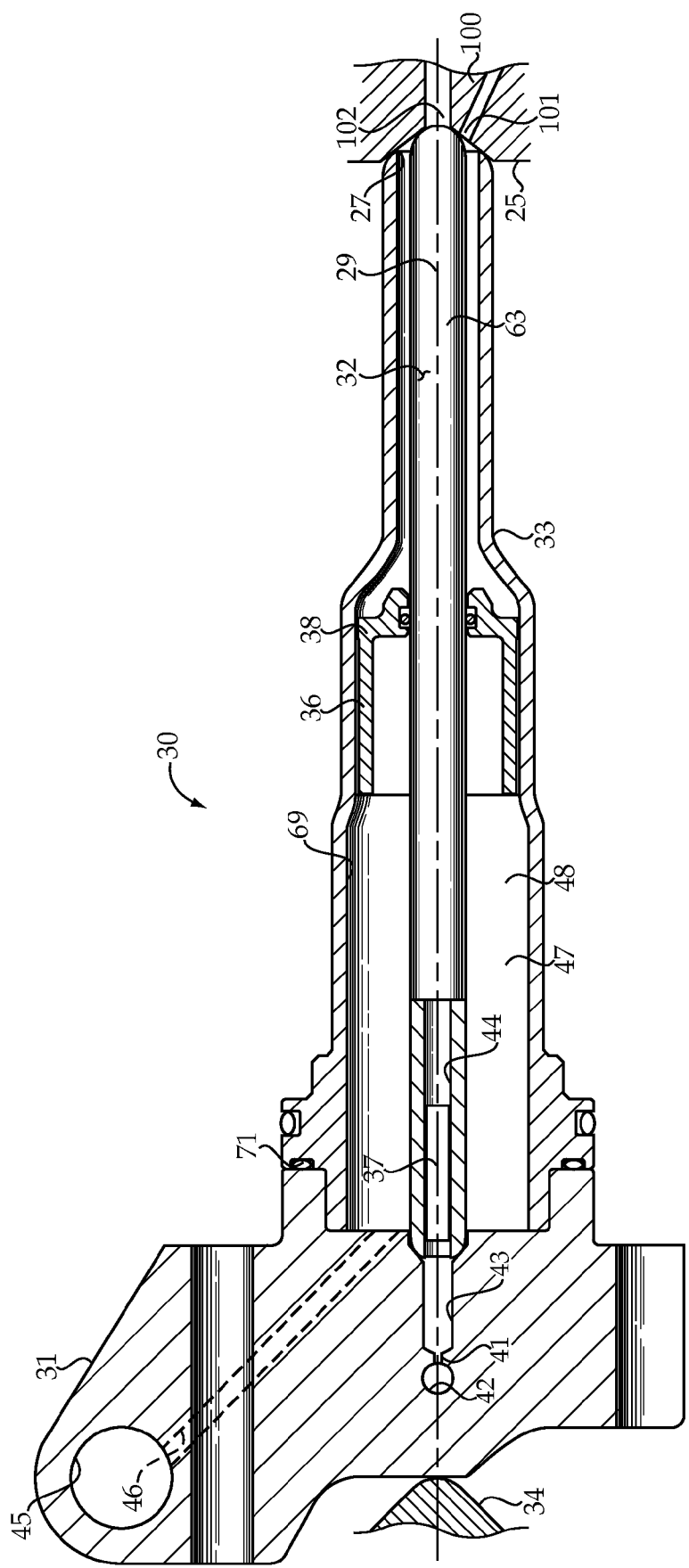
FIG. 4 is a sectioned side view through a co-axial quill assembly according to another aspect of the present disclosure.

As best shown in FIGS. 1 and 2, the blocks 31 of the co-axial quill assemblies 30 may be daisy-chained together with gaseous fuel line segments 18 and liquid fuel line segments 19 to define the gaseous fuel common rail 21 and the liquid fuel common rail 22, respectively. The last co-axial quill assembly 30 in the daisy-chain may have a set of plugs in place of the fittings shown in FIG. 2. As best shown in FIG. 4, the co-axial quill assembly 30 may include an inner quill 32 and an outer quill 33 in sealing contact with a common conical seat 27 of each fuel injector 25. In the illustrated embodiment, a pressure damping chamber 48 may be defined in each co-axial quill assembly 30 in order to damp pressure waves moving from gaseous fuel common rail 21 toward the respective fuel injector 25, especially during an injection event. Each co-axial quill assembly 30 may include a load adjusting clamp 34 in contact with a block 31 at a load adjustment location that is intersected by the axis 29 of the inner quill 32.

Each block 31 of each co-axial quill assembly 30 defines a gaseous rail passage 45 that may be oriented perpendicular to the axis 29 of inner quill 32 and fluidly connected to a gaseous fuel passage 46. The gaseous rail passage 45 may extend completely through block 31 in order to facilitate the daisy chain connection structure shown in FIGS. 1 and 2. Each block 31 may also includes a liquid rail passage 42, which may extend all the way through, and that is oriented perpendicular to the axis 29 and fluidly connected to a liquid fuel passage 43 and liquid fuel conduit 44. A segment of liquid fuel passage 43 may have an orifice segment 41, as shown, to reduce a flow rate from the liquid rail 22 to help manage transients in the liquid quill 32. Practical manufacturing limitations may forbid mass production of co-axial quill assemblies 30 in which either the inner quill 32 or the outer quill 33 are integrally formed with block 31, or each other. Thus, an annular seal 71 (e.g. O-ring) may serve to seal against leakage of gaseous fuel from between block 31 and outer quill 33 of co-axial quill assembly 30. In the illustrated construction, the inner quill 32 is out of contact with the outer quill 33 in each co-axial quill assembly 30. A gaseous fuel conduit 47 is fluidly connected to gaseous fuel passage 46, and also extends between outer surface 63 of inner quill 32 and the inner surface 69 of outer quill 33. The gaseous rail passage 45 of each block 31 may define a portion of the gaseous fuel common rail 21. Likewise, the liquid rail passage 42 of each block 31 may define a segment of the liquid fuel common rail 22.

In order to trap metallic debris often liberated into the fuel flows during the first time operation of engine 10 after being built, co-axial quill assembly 30 may include a gaseous fuel edge filter 36 and a liquid fuel edge filter 37. In the illustrated embodiment, liquid fuel edge filter 37 may be positioned in the liquid fuel conduit 44 defined by inner quill 32. The gaseous fuel edge filter 36 is shown positioned within outer quill 33. In the illustrated embodiment, gaseous fuel edge filer 36 may have a combined dual purpose by including a retainer 38 that may inhibit inner quill 32 from falling out of a matched outer quill 33 during pre-installation handling.

Figure 5:
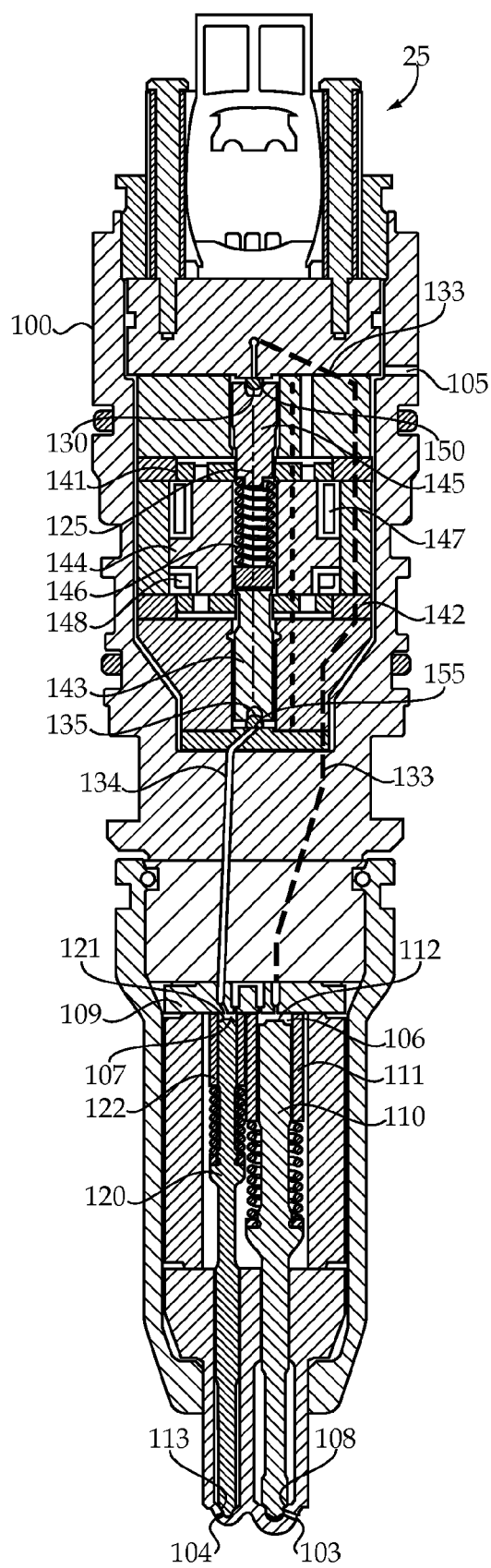
FIG. 5 is a sectioned front view of a fuel injector according to an aspect of the present disclosure.
Figure 6:
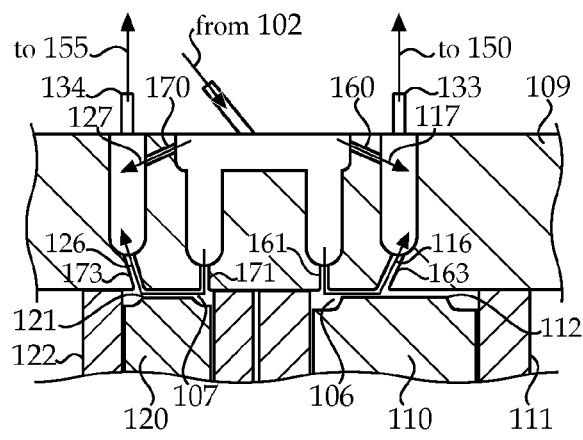
FIG. 6 is an enlarged sectioned side view of a region around an orifice disk according to another aspect of the present disclosure.

Referring in addition to FIGS. 5 and 6, a fuel injector 25 according to the present disclosure includes an injector body 100 that defines a first nozzle outlet set 103, a second nozzle outlet set 104 and a drain outlet 105. Injector body 100 also defines a first fuel inlet 101 and a second fuel inlet 102 that can be seen in the sectioned view of FIG. 4 opening through the common conical seat 27 of fuel injector 25. Disposed within injector body 100 are a first control chamber 106 and a second control chamber 107. A first check valve member 110 has a closing hydraulic surface 112 exposed to fluid pressure in the first control chamber 106. The first check valve member 110 is movable between a closed position, as shown, in contact with a first nozzle seat 108 to fluidly block the first fuel inlet 101 to the first nozzle outlet set 103, and an open position out of contact with the first nozzle seat 108 to fluidly connect the first fuel inlet 101 to the first nozzle outlet set 103 via a passage not visible in the sectioned view of FIG. 5. First control chamber 106 may be partially defined by a first sleeve 111.

A second check valve member 120 has a closing hydraulic surface 121 exposed to fluid pressure in the second control chamber 107. The second check valve member 120 is movable between a closed position, as shown, in contact with a second nozzle seat 113 to fluidly block the second fuel inlet 102 to the second nozzle outlet set 104, and an open position out of contact with the second nozzle seat 113 to fluidly connect the second fuel inlet 102 to the second nozzle outlet set 104 via a passage not visible in the sectioned view of FIG. 5. The second control chamber 107 may be partially defined by a second sleeve 122. Thus, injection of a first fuel through first nozzle outlet set 103 is facilitated by movement of first check valve member 110, while injection of a second fuel through second nozzle outlet set 104 is facilitated by movement of the second check valve member 120. Those skilled in the art will appreciate that the first and second nozzle outlet sets 103, 104 might be expected to each include six nozzle outlet sets that are arranged around respective centerlines in a manner well known in the art. However, nozzle outlet sets 103 and 104 could each include as few as one nozzle outlet or any number of nozzle outlets in any arrangement without departing from the present disclosure.

A first control valve member 130 is positioned in injector body 100 and is movable along a common centerline 125 between a first position at which the first control chamber 106 is fluidly blocked to the drain outlet 105, and a second position at which the first control chamber 106 is fluidly connected to the drain outlet 105. When first control chamber 106 is fluidly connected to drain outlet 105, pressure in first control chamber 106 drops, relieving pressure on closing hydraulic surface 112 to allow first check valve member 110 to lift to facilitate an injection of the first fuel (e.g. natural gas) through first nozzle outlet set 103. A second control valve member 135 is positioned in the injector body 100 and movable along the common centerline 125 between a first position at which the second control chamber 107 is fluidly blocked to the drain outlet 105, and a second position at which the second control chamber 107 is fluidly connected to the drain outlet 105. When second control chamber 107 is fluidly connected to drain outlet 105, fluid pressure acting on closing hydraulic surface 121 is relieved to allow second check valve member 120 to lift to an open position to facilitate injection of the second fuel (e.g. liquid diesel) through the second nozzle outlet set 104. In the illustrated embodiment, the first and second control valve members 130, 135 are intersected by the common centerline 125. The respective control valve members 130, 135 may be moved to one of their respective first and second positions with first and second electrical actuators that include first and second coils 147, 148, respectively. The control valve members 130, 135 may be biased to the their respective first positions by a shared biasing spring 146. A first armature 141 may be attached to a pusher 145 in contact with first control valve member 130. The first armature 141, the pusher 145 and the first control valve member 130 may be biased to the position shown in contact with first valve 150 which may be a flat seat, by shared biasing spring 146. Thus, first armature 141 can be thought of as being operably coupled to move the first control valve member 130. A second armature 142 may be operably coupled to move the second control valve member 135 by way of pusher 143. A shared stator 144 houses first and second coils 147, 148 and separates the first armature 141 from the second armature 142.

Referring now more specifically to the enlarged view of FIG. 6, the first control valve member 130 is in contact and out of contact with a first valve seat 150 at the first position and the second position, respectively. Likewise, the second control valve member 135 is in contact and out of contact with a second valve seat 155 at its first position and second position, respectively. In the illustrated embodiment, at least one of the first valve seat 150 and second valve seat 155 may be a flat seat. However, one or the other may be a conical seat. When the upper coil 147 mounted in common stator 144 is energized, armature 141 and pusher 145 are moved downward allowing the high pressure in control passage 133 to push first control valve member 130 out of contact with first valve seat 150 to fluidly connect control chamber 106 to drain outlet 105. In the illustrated embodiment, the first control chamber 106 may always be fluidly connected to the high pressure in the second fuel inlet 102 via an F orifice 160 and a Z orifice 161. The upstream ends of respective F and Z orifices 160 and 161 may be fluidly connected to the second fuel inlet 102 via passages not visible in the sectioned views. The first control chamber 106 is fluidly connected to the control passage 133 via a so called A orifice 163. Thus, when first control valve member 130 lifts off of first valve seat 150, the second fuel inlet 102 becomes fluidly connected to the drain outlet 105 through a Z-A pathway 116 and an F pathway 117 that are fluidly in parallel with each other. The Z-A pathway 116 includes Z orifice 161, the first control chamber 106 and A orifice 163 in series, and the F pathway includes an F orifice 160. When open, the high pressure in second fuel inlet 102 will be directly fluidly connected to drain outlet 105 via both the Z orifice 161 and the F orifice 160. However, the connection to drain outlet 105 is sufficient to lower pressure in control chamber 106 to allow the first check valve member 110 to lift and open to commence an injection event. When first control valve member 130 is moved upward to close first valve seat 150, the parallel fluid connections to high pressure second fuel inlet 102 facilitated by F orifice 160 and Z orifice 161 is closed to allow pressure to quickly build in control chamber 106 to abruptly end the injection event.

The second control chamber 107 may always be fluidly connected to the high pressure in second fuel inlet 102 via an F orifice 170 and a Z orifice 171. The upstream ends of respective F and Z orifices 170, 171 may be fluidly connected to the second fuel inlet 102 via passages not visible in the sectioned view. The second control chamber 107 is fluidly connected to the control passage 134 via a so-called A orifice 173. Thus, when the second control valve member 135 moves off of the second valve seat 155, the second fuel inlet 102 becomes fluidly connected to the drain outlet 105 through a Z-A pathway 126 and an F pathway 127 that are fluidly in parallel with each other. The Z-A pathway 126 includes Z orifice 171, the second control chamber 107 and the A orifice 163 in series, and the F pathway includes an F orifice 170. When open, the high pressure and second fuel inlet 102 will be directly fluidly connected to drain outlet 105 via both the Z orifice 171 and the F orifice 170. However, the connection to drain outlet 105 is sufficient to lower pressure in control chamber 107 to allow the second check valve member 120 to lift and open to commence a liquid injection event. When the second control valve member 135 is moved to close the second valve seat 155, the parallel fluid connections to high pressure second fuel inlet 102 facilitated by F orifice 170 and Z orifice 171 allow pressure to quickly build in control chamber 107 to abruptly end the injection event.

Those skilled in the art will appreciate that the illustrated embodiment utilizes liquid diesel fuel to control movement of the first check valve member 110 and the second check valve member 120 to facilitate control over gaseous fuel injection events and liquid diesel fuel injection events, respectively. Although readily apparent from FIG. 6, the first Z orifice 161, the first A orifice 163, the first F orifice 160, the second Z orifice 171, the second A orifice 163 and the second F orifice 171 may all have respective flow areas of a same order of magnitude. In other words, none of the orifices has a flow area more than ten times the flow area of any other one of the named orifices. Those skilled in the art will appreciate that injector body 100 may be constructed from a plurality of components arranged in an injector stack. In the illustrated embodiment, the injector stack includes an orifice disk 109. As best shown in FIG. 6, the first Z orifice 161, the first A orifice 163, the first F orifice 160, the second Z orifice 171, the second A orifice 173 and the second F orifice 170 may all be defined by orifice disk 109. This strategy may serve to locate all of these precision bored orifices in a single fuel injector component. Although not necessary, common centerline 125 may intersect both the first control valve member 130 and the second control valve member 135, which may be interchangeable identical components that may be made from a suitable ceramic material.

In the illustrated embodiment, the first check valve member 110 and the second check valve member 120 are side by side and spaced apart. Nevertheless, those skilled in the art will appreciate that the structure could be different. For instance, dual concentric check valve members that were concentric with common centerlines would also fall within the scope of the present disclosure.

INDUSTRIAL APPLICABILITY

The present disclosure applies broadly to any engine that utilizes two fluidly distinct common rails to deliver fuel to a single fuel injector associated with each engine cylinder. The contents of the respective common rails may differ in at least one of pressure, chemical identity and matter phase without departing from the present disclosure. In the illustrated example, the respective common rails may differ in all three by containing pressurized natural gas and liquid diesel fuel, respectively at different pressures. The present disclosure also finds particular applicability in dual fuel injectors with an increased need for control over injection events facilitated by the added F orifices in the control strategy.

Referring back to all of the FIGS. 1-6, a method of operating dual fuel engine 10 begins by assembling a dual fuel common rail system 20 to an engine housing 11. Gaseous fuel is supplied from the gaseous fuel common rail 21 to each of the plurality of fuel injectors 25 by a respective co-axial quill assembly 30. Likewise, liquid fuel from a liquid fuel common rail 22 is supplied to each of the plurality of fuel injectors 25 by the same respective co-axial quill assemblies 30. When in operation, gaseous fuel is injected from each fuel injector 25 into an engine cylinder 12 responsive to a gaseous fuel injection signal communicated from electronic controller 15 to the fuel injector 25. In particular, a gaseous fuel injection event is initiated by energizing the upper electrical actuator (upper coil 147) to move armature 141 and first control valve member 130 downward out of contact with first valve seat 150. This fluidly connects control chamber 106 to drain outlet 105 to reduce pressure acting on closing hydraulic surface 112.

The gaseous fuel check valve 110 then lifts out of contact with first nozzle seat 108 to commence spray of gaseous fuel out of first nozzle outlet set 103. The injection event is ended by de-energizing the upper electrical actuator to allow armature 141 and control valve member 130 to move upward under the action of spring 146 back into contact to close first valve seat 150. When this occurs, pressure abruptly rises in control chamber 106 acting on closing hydraulic surface 112 to push check valve member 110 back downward into contact with seat 108 to end the gaseous fuel injection event.

Also, liquid fuel from the fuel injector 25 is injected directly into engine cylinder 12 from the same fuel injector 25 responsive to a liquid fuel injection signal from electronic controller 15. In particular, a liquid fuel injection event is initiated by energizing the lower coil 48 to move armature 142 upward along common centerline 125. This causes pusher 143 to move second control valve member 135 out of contact with second valve seat 155. This in turn relieves pressure in control chamber 107 allowing check valve member 120 to lift out of contact with second nozzle seat 113 to commence a liquid fuel injection event out of nozzle outlet set 104. To end the injection event, the lower electrical actuator (lower coil 148) is de-energized. When this is done, shared biasing spring 146 pushes armature 142 and second control valve member 135 back up into contact with second valve seat 155 to close the fluid connection between control chamber 107 and drain outlet 105. When this is done, pressure acting on closing hydraulic surface 121 quickly rises causing check valve member 120 to move downward and back into contact with second nozzle seat 113 to end the liquid fuel injection event. Both liquid and natural gas injection events are ended by fluidly connecting the respective control chambers 107, 106 to the liquid fuel common rail 22 through respective F orifices 160, 170, and Z orifices 161, 171 that are fluidly in parallel.

Figure 7:
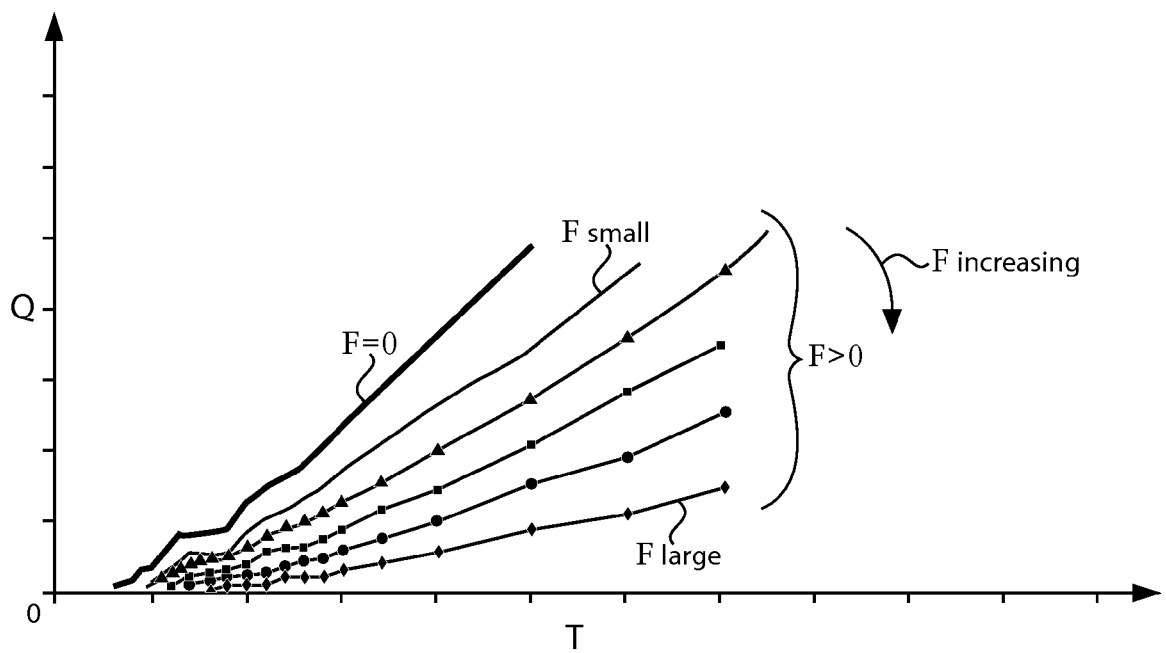
FIG. 7 is a graph of fuel injection volume (Q) versus time (T) for various sized F orifices for gaseous fuel injection.

The inclusion of the F orifice in one or both of the control line strategies for liquid and gaseous fuel injection events can serve to provide more stable and consistent performance in terms of fuel injection delivery quantities, especially in relation to smaller quantity fuel injection events. In addition, inclusion of the F orifices can shorten the time difference between end of current to the electrical actuator and end of injection by hastening the time in which pressure builds in the respective control chamber 106, 107 to end an injection event. Referring in addition to FIG. 7, a graph of fuel injection quantity (Q) versus on time (T) for otherwise identical fuel injectors would no F orifice or with a variety of different sized F orifices. The graphs show that by increasing the size of the F orifice, the delivery curve becomes more linear, however, more on time may be necessary to deliver the same quantity Q of fuel. Thus, some trade off and engineering judgment may be required to decide upon the appropriate sized F orifice to meet requirements in both injection flow rates and injection quantity consistency and stability. The graph of FIG. 7 is illustrated for the F orifice 160 associated with injection of gaseous fuel.

Figure 8:
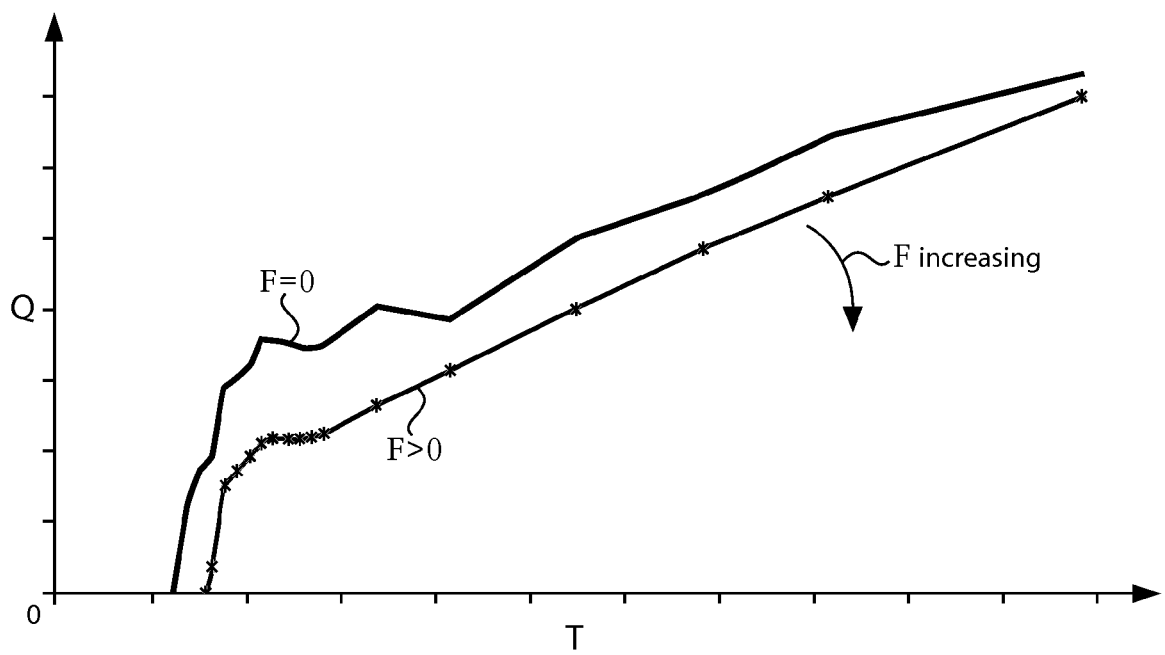
FIG. 8 is a graph of fuel injection volume (Q) versus time (T) for fuel injectors with and without an F orifice control for a liquid fuel injection.

Referring to FIG. 8, a comparison of fuel injection quantity Q versus injector on time for a liquid fuel injection event is shown with and without an F orifice. The lower curve shows that the F orifice renders the delivery curve more linear down to a smaller minimum injection quantity of liquid diesel fuel. However, that gain may result in requiring slightly longer on times to inject a same quantity of liquid diesel fuel than an otherwise identical fuel injector with no F orifice as shown by the upper curve. However, the linear nature of the delivery curve renders the inclusion of an F orifice 170 of a suitable flow area highly desirable both in decreasing the minimum controllable injection quantity of liquid diesel fuel, but also making the delivery curve more linear over a larger range of injection quantities Q.

It should be understood that the above description is intended for illustrative purposes only, and is not intended to limit the scope of the present disclosure in any way. Those skilled in the art will appreciate that other aspects of the disclosure can be obtained from a study of the drawings, the disclosure and the appended claims.

What is claimed is:

1. A fuel injector comprising:
an injector body defining a first fuel inlet, a second fuel inlet, a first nozzle outlet set, a second nozzle outlet set, and a drain outlet, and defining therein a first control chamber and a second control chamber;
a first check valve member with a closing hydraulic surface exposed to fluid pressure in the first control chamber, and being movable between a closed position in contact with a first nozzle seat to fluidly block the first fuel inlet from the first nozzle outlet set, and an open position out of contact with the first nozzle seat to fluidly connect the first fuel inlet to the first nozzle outlet set;
a second check valve member with a closing hydraulic surface exposed to fluid pressure in the second control chamber, and being movable between a closed position in contact with a second nozzle seat to fluidly block the second fuel inlet from the second nozzle outlet set, and an open position out of contact with the second nozzle seat to fluidly connect the second fuel inlet to the second nozzle outlet set;
a first control valve member in fluid communication with the first control chamber via a first control passage, the first control valve member being positioned in the injector body and being movable between a first position in contact with a first valve seat at which the first control chamber is fluidly blocked from the drain outlet via the first control passage, and a second position out of contact with the first valve seat at which the second fuel inlet is fluidly connected to the drain outlet via the first control passage;
a second control valve member positioned in the injector body and being movable between a first position in contact with a second valve seat at which the second control chamber is fluidly blocked from the drain outlet, and a second position out of contact with the second valve seat at which the second control chamber is fluidly connected to the drain outlet; and
a first Z-A pathway effecting fluid communication between the second fuel inlet and the first control passage, and a first F pathway effecting fluid communication between the second fuel inlet and the first control passage independent of a position of the first control valve member with respect to the injector body,
the first Z-A pathway including a first Z orifice, the first control chamber, and a first A orifice in series,
the first F pathway including a first F orifice,
the second fuel inlet being fluidly connected to the drain outlet through a second Z-A pathway and a second F pathway via the second control valve member when the second control valve member is located at the second position,
the second Z-A pathway including a second Z orifice, the second control chamber, and a second A orifice in series,
the second F pathway including a second F orifice, and
the second Z-A pathway the second F pathway being fluidly coupled in parallel with each other.

2. The fuel injector of claim 1 wherein the first Z orifice, the first A orifice, the first F orifice, the second Z orifice, the second A orifice, and the second F orifice have respective flow areas of a same order of magnitude.

3. The fuel injector of claim 2 wherein
the injector body includes an injector stack with an orifice disk; and
the first Z orifice, the first A orifice, the first F orifice, the second Z orifice, the second A orifice, and the second F orifice are all defined by the orifice disk.

4. The fuel injector of claim 3 wherein the first check valve member and the second check valve member are side by side and spaced apart.

5. The fuel injector of claim 4 wherein a common centerline intersects the first control valve member and the second control valve member.

6. The fuel injector of claim 1 wherein the first check valve member and the second check valve member are side by side and spaced apart.

7. The fuel injector of claim 1 wherein a common centerline intersects the first control valve member and the second control valve member.

8. A fuel system comprising:
a plurality of fuel injectors, each fuel injector of the plurality of fuel injectors including
an injector body defining a first fuel inlet, a second fuel inlet, a first nozzle outlet set, a second nozzle outlet set, and a drain outlet, and defining therein a first control chamber and a second control chamber,
a first check valve member with a closing hydraulic surface exposed to fluid pressure in the first control chamber, and being movable between a closed position in contact with a first nozzle seat to fluidly block the first fuel inlet from the first nozzle outlet set, and an open position out of contact with the first nozzle seat to fluidly connect the first fuel inlet to the first nozzle outlet set,
a second check valve member with a closing hydraulic surface exposed to fluid pressure in the second control chamber, and being movable between a closed position in contact with a second nozzle seat to fluidly block the second fuel inlet from the second nozzle outlet set, and an open position out of contact with the second nozzle seat to fluidly connect the second fuel inlet to the second nozzle outlet set,
a first control valve member in fluid communication with the first control chamber via a first control passage, the first control valve member being positioned in the injector body and being movable between a first position in contact with a first valve seat at which the first control chamber is fluidly blocked from the drain outlet via the first control passage, and a second position out of contact with the first valve seat at which the second fuel inlet is fluidly connected to the drain outlet via the first control passage,
a first Z-A pathway effecting fluid communication between the second fuel inlet and the first control passage, and a first F pathway effecting fluid communication between the second fuel inlet and the first control passageway independent of a position of the first control valve member with respect to the injector body,
a second control valve member positioned in the injector body and being movable between a first position in contact with a second valve seat at which the second control chamber is fluidly blocked from the drain outlet, and a second position out of contact with the second valve seat at which the second fuel inlet is fluidly connected to the drain outlet through a second Z-A pathway and a second F pathway that are fluidly coupled in parallel with each other,
the first Z-A pathway includes a first Z orifice, the first control chamber, and a first A orifice in series, and the second Z-A pathway includes a second Z orifice, the second control chamber, and a second A orifice in series, and
the first F pathway includes a first F orifice, and the second F pathway includes a second F orifice;
a source of a first fuel fluidly connected to the first fuel inlet;
a source of a second fuel fluidly connected to the second fuel inlet; and
an electronic controller in control communication with each fuel injector of the plurality of fuel injectors,
the first fuel differing from the second fuel in at least one of chemical identity, matter phase, and pressure.

9. The fuel system of claim 8 wherein the first fuel is natural gas, and the source of the first fuel includes a first common rail; and
the second fuel is liquid diesel fuel, and the source of the second fuel includes a second common rail.

10. The fuel system of claim 9 wherein the first fuel inlet and the second fuel inlet open through a common conical seat of the injector body.

11. The fuel system of claim 10 wherein the first Z orifice, the first A orifice, the first F orifice, the second Z orifice, the second A orifice, and the second F orifice have respective flow areas of a same order of magnitude.

12. The fuel system of claim 11 wherein the injector body includes an injector stack with an orifice disk; and
the first Z orifice, the first A orifice, the first F orifice, the second Z orifice, the second A orifice, and the second F orifice are all defined by the orifice disk.

13. The fuel system of claim 12 wherein the first check valve member and the second check valve member are side by side and spaced apart; and
a common centerline intersects the first control valve member and the second control valve member.

14. A method for operating a fuel system having a plurality of fuel injectors, each fuel injector of the plurality of fuel injectors including
an injector body defining a first fuel inlet, a second fuel inlet, a first nozzle outlet set, a second nozzle outlet set, and a drain outlet, and defining therein a first control chamber and a second control chamber;
a first check valve member with a closing hydraulic surface exposed to fluid pressure in the first control chamber, and being movable between a closed position in contact with a first nozzle seat to fluidly block the first fuel inlet from the first nozzle outlet set, and an open position out of contact with the first nozzle seat to fluidly connect the first fuel inlet to the first nozzle outlet set;
a second check valve member with a closing hydraulic surface exposed to fluid pressure in the second control chamber, and being movable between a closed position in contact with a second nozzle seat to fluidly block the second fuel inlet from the second nozzle outlet set, and an open position out of contact with the second nozzle seat to fluidly connect the second fuel inlet to the second nozzle outlet set;
a first control valve member in fluid communication with the first control chamber via a first control passage, the first control valve member being positioned in the injector body and being movable between a first position in contact with a first valve seat at which the first control chamber is fluidly blocked from the drain outlet via the first control passage, and a second position out of contact with the first valve seat at which the second fuel inlet is fluidly connected to the drain outlet via the first control passage;

a first Z-A pathway effecting fluid communication between the second fuel inlet and the first control passage, and a first F pathway effecting fluid communication between the second fuel inlet and the first control passageway independent of a position of the first control valve member with respect to the injector body, a second control valve member positioned in the injector body and being movable between a first position in contact with a second valve seat at which the second control chamber is fluidly blocked from the drain outlet, and a second position out of contact with the second valve seat at which the second fuel inlet is fluidly connected to the drain outlet through a second Z-A pathway and a second F pathway that are fluidly coupled in parallel with each other;

the first Z-A pathway includes a first Z orifice, the first control chamber, and a first A orifice in series, and the second Z-A pathway includes a second Z orifice, the second control chamber, and a second A orifice in series; and the first F pathway includes a first F orifice, and the second F pathway includes a second F orifice, the method comprising the steps of:

injecting a first fuel from the first nozzle outlet set by moving the first control valve member from the first position to the second position; and injecting a second fuel from the second nozzle outlet set by moving the second control valve member from the first position to the second position.

15. The method of claim 14 wherein the first fuel is natural gas and the second fuel is liquid diesel fuel.

16. The method of claim 15 further comprising:
supplying the natural gas to the first fuel inlet of the fuel injectors from a gaseous fuel common rail; and
supplying the liquid diesel fuel to the second fuel inlet of the fuel injectors from a liquid fuel common rail.

17. The method of claim 16 further comprising:
ending a natural gas injection event by moving the first control valve member into contact with the first valve seat; and
ending a liquid diesel injection event by moving the second control valve member into contact with the second valve seat.

18. The method of claim 17 wherein the step of ending the natural gas injection event includes fluidly connecting the first control chamber to the liquid fuel common rail through the first F orifice and the first Z orifice that are fluidly coupled in parallel; and
the step of ending the liquid diesel injection event includes fluidly connecting the second control chamber to the liquid fuel common rail through the second F orifice and the second Z orifice that are fluidly coupled in parallel.

* * * * *